United States Patent [19]

Bishop et al.

[11] 4,023,085

[45] May 10, 1977

[54] NUMERICAL CONTROL SYSTEM HAVING A DIGITIZED PHASE LOOP

[75] Inventors: Everett Reece Bishop; Marcel Henri Leroux, both of Waynesboro, Va.

[73] Assignee: General Electric Company, New York, N.Y.

[22] Filed: Aug. 6, 1975

[21] Appl. No.: 602,489

[52] U.S. Cl. .............................. 318/608; 318/603; 318/661

[51] Int. Cl.² ..................... G05B 1/03; G05B 19/28

[58] Field of Search .......... 318/605, 608, 661, 603; 235/151.11

[56] References Cited

UNITED STATES PATENTS 3,473,098  10/1969  Waller .............................. 318/608

Primary Examiner—Robert K. Schaefer
Assistant Examiner—Michael K. Mutter
Attorney, Agent, or Firm—Stephen A. Young; Walter C. Bernkopf; Robert A. Cahill

[57] ABSTRACT

A numerical control system having a digitized phase loop comprising a motor for moving an object being controlled, a servo amplifier for driving the motor, feedback means coupled to the motor for generating a first signal indicative of the actual position of the object, and means for converting the first signal to a digital signal indicative of a change in the actual position of the object. Further provided is means for comparing a command digital signal indicative of the desired change in position of the object with the digital signal indicative of the actual change in position of the object to generate an error digital signal and for converting the error signal to an analog signal for driving the servo amplifier.

2 Claims, 1 Drawing Figure

NUMERICAL CONTROL SYSTEM HAVING A DIGITIZED PHASE LOOP

BACKGROUND OF THE INVENTION

1. Field Of The Invention

This invention relates to numerical control systems, and more particularly, to the phase loop of a numerical control system.

2. Description Of The Prior Art

The phase loop of prior art numerical control systems is clearly shown and explained in U.S. Pat. No. 3,519,904 and assigned to the same assignee as the assignee of the present invention. In this patent a clock oscillator is shown driving a reference counter and a command counter. The output from the reference counter is coupled to a phase splitter which separates the output of the reference counter into two signals 90° apart. These signals are coupled via respective resolver supplies to respective stator windings of a resolver. The resolver has an armature which is responsive to movement of an object being controlled to generate an output waveform which is processed by a waveshaper to produce a square wave analog signal which is indicative of the actual position of the object. The square wave output signal of the command counter is displaced in phase with respect to the square wave output signal of the reference counter by a predetermined phase displacement which is indicative of the desired position of the object. The output signal from the command counter is then compared with the output signal from the waveshaper by a phase descriminator using standard analog techniques to produce an error analog signal that drives a servo amplifier, which amplifier in turn drives a motor to move the object in to a direction towards the desired position. In attempting to modernize servo systems, and, in particular, numerical control systems, it is hoped that a digital comparison between the above signals can be made.

OBJECTS OF THE INVENTION

It is therefore an object of this invention to provide a numerical control system capable of converting a phase analog signal indicative of an actual position of an object to be controlled to a digital signal indicative of a change in the actual position of the object.

It is a further object of this invention to provide a numerical control system which allows for a digital comparison between a first signal indicative of a change in a desired position of an object to be controlled and another signal indicative of a change in the actual position of the object to be controlled.

It is a further object of this invention to provide a numerical control system which has a digitized phase loop.

Other objects of the invention will be pointed out hereinafter.

SUMMARY OF THE INVENTION

According to a broad aspect of the invention there is provided a numerical control system comprising a motor for moving an object being controlled, a servo amplifier for driving the motor, feedback means coupled to the motor for generating a first signal indicative of the actual position of the object, and means for converting the first signal to a digital signal indicative of a change in the actual position of the object. Also provided is means for comparing a command digital signal indicative of the desired change in position of the object with the digital signal indicative of the change in the actual position of the object to generate an error digital signal and for converting the error digital signal to an analog signal for driving the servo amplifier.

According to another aspect of the invention, the feedback means is comprised of a resolver having an armature responsive to movement of the object, a clock oscillator, means, including a reference counter driven by the clock oscillator, for exciting the resolver to generate an output waveform therefrom which is indicative of the actual position of the armature, and waveshaping means for changing the output waveform from the resolver to the first signal indicative of the actual position of the object and having cyclical transitions.

The means for converting the first signal to the digital signal indicative of the change in the actual position of the object is comprised of a second counter, first and second storage means and means for subtracting the signal stored in the first storage means from the signal stored in the second storage means to generate the digital signal indicative of the change in the actual position of the object. The second counter is driven by the clock oscillator and synchronized to cyclical transitions of the reference waveform generated by the reference counter. A plurality of signals is consecutively received within the first storage means from the second counter in response to respective consecutive cyclical transitions of the first signal, wherein each of the received signals has a count indicative of the actual position of the object. A plurality of signals are consecutively received by the second storage means from the first storage means in response to the respective consecutive cyclical transitions of the first signal. The signals consecutively stored in the first and second storage means are consecutively subtracted from one another in response to the respective consecutive cyclical transitions of the first signal to consecutively generate a plurality of digital signals each of the generated signals being indicative of the change in the actual position of the object in the time between two successive cyclical transitions of the first signal.

DESCRIPTION OF THE PREFERRED EMBODIMENT

Figure 1:
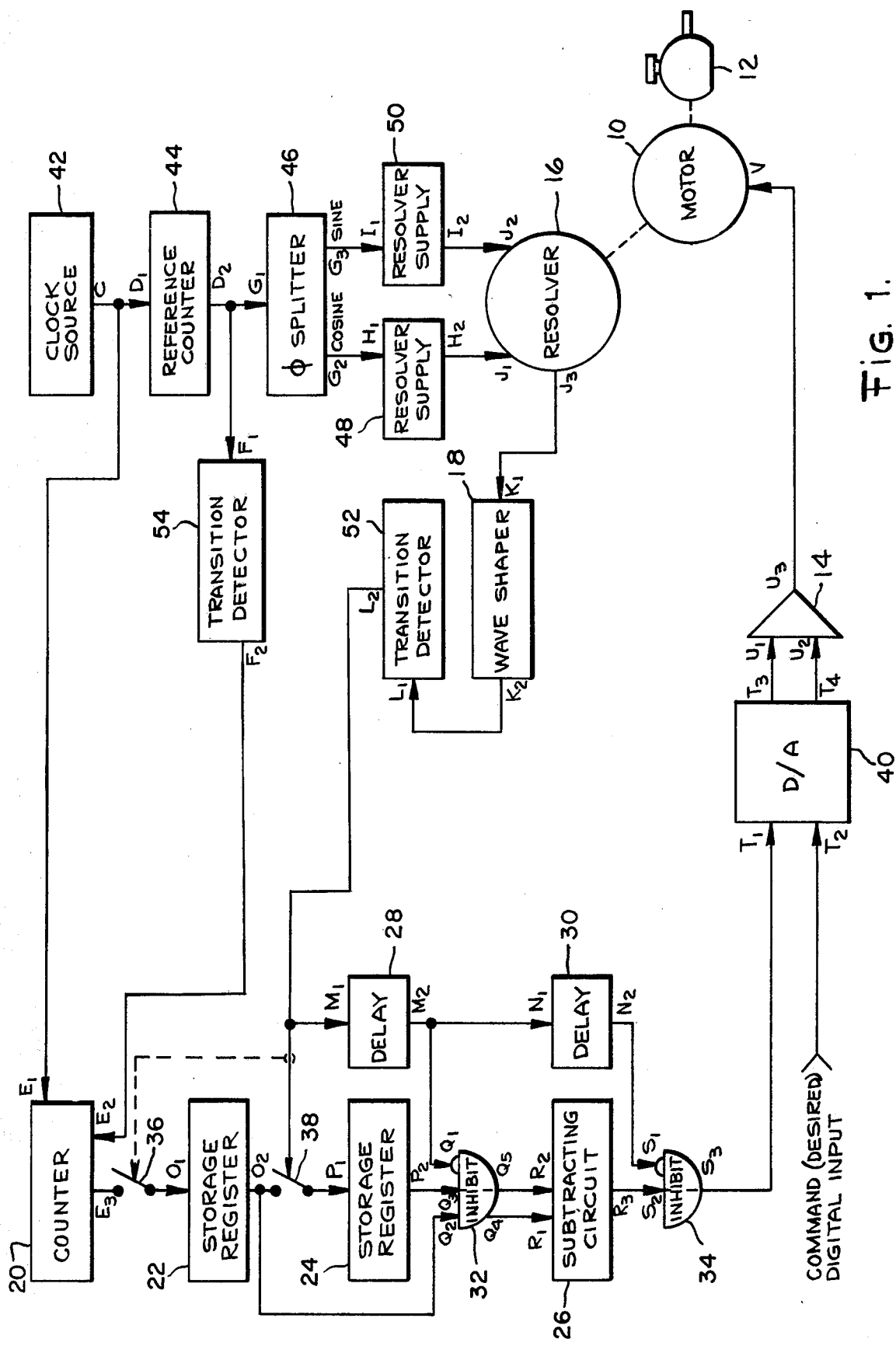
FIG. 1 shows a block diagram of the phase loop of a numerical control system in accordance with this invention.

Referring to FIG. 1 of the drawing, the invention will now be explained. The phase loop of the numerical control system is comprised of a motor 10 for moving an object 12, a servo amplifier 14 for driving the motor, feedback means provided by a resolver 16 and a waveshaper 18 coupled to the motor for generating a first signal indicative of the actual position of the object, means, provided by a counter 20, first and second storage (means) registers 22 and 24, a subtracting circuit 26, delay circuits 28 and 30, inhibitor gates 32 and 34 and respective first and second switch means 36 and 38, for converting the first signal to a digital signal indicative of a change in the actual position of the object, and means, provided by a D to A converter 40, for comparing a command digital signal indicative of the desired change in position of the object with the digital signal indicative of the change in the actual position of the object to generate an error digital signal and for converting the error digital signal to an analog signal for driving the servo amplifier.

Also provided is a clock source 42, a reference counter 44, a phase splitter 46, first and second resolver supplies 48 and 50, and first and second respective transition detector circuits 52 and 54. Clock source 42, reference counter 44, phase splitter 46, resolver supplies 48 and 50, resolver 16, waveshaper 18, motor 10 and object 12 are described in detail in U.S. Pat. No. 3,519,904 Supra.

D to A converter 40, which compares a digital signal indicative of the change in the actual position of the object with a digital signal indicative of the desired change in the position of the object to generate an error digital signal and provides a means for converting the generated error digital signal to an analog signal, is provided by an apparatus, which includes a gain integrator, the whole of which is shown and explained in greater detail in our copending U.S. patent application Ser. No. 590,940, filed June 27, 1975, entitled "Apparatus For Converting A Plurality of Digital Bits of Information To An Analog Signal", inventors E. R Bishop and M. H. Leroux, and assigned to the same assignee as the assignee of the present invention.

In operation, a high frequency signal (for instance 250KHZ) is applied from an output terminal C of clock source 42 to an input terminal $D_1$ of reference counter 44, and to an input terminal $E_1$ of counter 20. Both reference counter 44 and counter 20 count down the signal from the clock source by a factor of 1000:1. A squarewave output reference signal is thus produced at an output terminal $D_2$ of reference counter 44, which reference signal has consecutive cyclical transitions with a period or interval between transitions 1000 times the duration of the period between transitions in the output signal from the clock source. Each of the cyclical transitions of the reference signal, in this instance, is defined by when the signal changes abruptly from one level to a more positive level. It should be understood of course, that the cyclical transitions could otherwise have been defined by when the signal changed abruptly from one level to a less positive level.

Both transition detectors 52 and 54 can be comprised of a differentiator circuit and a positively poled steering diode. Thus, when the squarewave output signal from counter 44 is applied to an input terminal $F_1$ of transition detector 54, a pulse is generated at an output terminal $F_2$ of detector 54 at each defined cyclical transition of the square wave output signal from reference counter 44. The generated pulses at output terminal $F_2$ of transition detector 54 are coupled to a sync input terminal $E_2$ of counter 20 so as to to synchronize the count within counter 20 to the cyclical transitions of the reference signal from reference counter 44. At the same time the output signal from reference counter 44 is coupled to an input terminal $G_1$ of phase splitter 46 so as to separate the reference signal into two signals 90° apart, which signals are applied from respective output terminals $G_2$ and $G_3$ of the phase splitter to respective input terminals $H_1$ and $I_1$ respective resolver supplies 48 and 50, and the signals from respective output terminals $H_2$ and $I_2$ of respective resolver supplies 48 and 50 are coupled to respective stator windings within resolver 16 via respective input terminals $J_1$ and $J_2$ to the resolver. Resolver 16 has an armature which is responsive to movement of motor 10 to produce an output waveform at its output terminal $J_3$.

This waveform is applied to an input terminal $K_1$ of waveshaper 18 so as to generate a square wave output (the first) signal at an output terminal $K_2$ of the waveshaper which has a phase displacement, from the reference signal, indicative of the actual position of object 12 being controlled by motor 10.

The square wave output signal is coupled from output terminal $K_2$ of waveshaper 18 to an input terminal $L_1$ of transition detector 52 so as to produce cyclical pulses at output terminal $L_2$ of transition detector 52 at the displaced cyclical transitions of the output signals of the waveshaper, which cyclical transition has been defined previously as when the output signal from the waveshaper abruptly changes from one level to a more positive level. The pulses indicative of the cylical transitions of the output signal of waveshaper 18 are applied to input control terminals of respective switch means 36 and 38 and an input terminal $M_1$ of delay 28. These pulses cause switch means 36 and 38 to close for the duration of the pulses. When switch means 36 closes, a digital signal having a count indicative of the actual position of object 12 is transmitted from an output terminal $E_3$ of counter 20 to an input terminal $O_1$ of storage register 22, and a digital signal stored within register 22 is transmitted from an output terminal $O_2$ of register 22 to an input terminal $P_1$ of storage register 24. Since the count within counter 20 is changing at the clock rate of clock source 42, the signal within counter 20 effectively establishes 1000 incremental positions between sync pulses for object 12.

The pulse applied to input terminal $M_1$ of delay 28 is delayed for a time sufficient to allow completion of the receiving of the signals within storage registers 22 and 24. The pulse is then applied from output terminal $M_2$ of delay 28 to an input terminal $N_1$ of delay 30 and an input control terminal $Q_1$ of inhibit gate 32. When the pulse from output terminal $M_2$ of delay 28 is applied to input control terminal $Q_1$ of inhibit gate 32, output signals from respective output terminals $O_2$ and $P_2$ of respective storage registers 22 and 24 are applied to respective input terminals $Q_2$ and $Q_3$ of the inhibit gate and are allowed to pass through the respective output terminals $Q_4$ and $Q_5$ of the inhibit gate to respective input terminals $R_1$ and $R_2$ of subtracting circuit 26. Inasmuch as the signal stored within storage register 22 is always transmitted to and stored within storage register 24 in response to the next cyclical transition pulse applied to switch means 36 and 38, the signal stored within storage register 22 is subtracted from the signal stored in storage register 24 in response to the delayed pulse indications of a cyclical transition of the output signal from waveshaper 18 so as to generate at the output terminal $R_3$ of subtracting circuit 26 a digital signal which is indicative of the change in the actual position of the object within a time period determined by two successive cyclical transitions of the output signal from waveshaper 18.

The cyclical transition pulse, which is applied to input terminal $N_1$ of delay 30, is delayed in time by delay 34, and is coupled from output terminal $N_2$ of delay 30 to an input control terminal $S_1$ of inhibit gate 34 to enable the inhibit gate immediately after a digital signal at output terminal $R_3$ of subtracting circuit 26 has been generated. This generated digital signal, which is indicative of the change in the actual position of the object, is coupled through input terminal $S_2$ and output terminal $S_3$ of inhibit gate 34 and to an input terminal $T_1$ of D to A converter 44. A path computation unit, or a tape reader supplies a command digital input signal indicative of the desired change in the position of the object to an input $T_2$ of D to A converter 40. As stated previously, the D to A converter compares the input signals applied to input terminals $T_1$ and $T_2$ to generate an error digital signal and then converts the error digital signal to an analog signal which is coupled from respective output terminals $T_3$ and $T_4$ of D to A converter 40 to respective input terminals $U_1$ and $U_2$ of servo drive amplifier 14. The amplified signal from an output terminal $U_3$ of amplifier 14 is applied to an input terminal V of motor 10 to move object 12 in accordance with the desired or programmed change in position.

Thus in the manner described above, the phase delayed signal indicative of the actual position of the object, which is generated at the output of waveshaper 18, has been successfully converted by the previously described phase loop digitizing circuit to a digital signal which is indicative of a change in the actual position of the object within a time period determined by two successive cyclical transitions of the reference signal at the output of the waveshaper so that this generated digital signal can be compared with a command digital signal indicative of the desired change in position of the object. At this point, it should be noted that the means for converting the signal generated by the feedback means to a digital signal indicative of a change in the actual position of the object can also be referred to as the means for digitizing the phase loop, and that the associated components, such as counter 20, register 22 and 24, subtracting circuit 26, delays 28 and 30, inhibit gates 32 and 34 and switch means 36 and 38, are all standard components.

It should also be noted that when the signals within respective storage registers 22 and 24 are compared and subtracted within circuit 26, if the count of the signal within register 22 is greater than the count of the signal within register 24, then the output signal applies to input terminal $T_1$ of the D to A converter will contain information indicating one polarity, and if the count of the signal within storage register 22 is less than the count of the signal within storage register 24, then the digital signal applied to input terminal $T_1$ will provide an indication of opposite polarity. In this manner the signal outputs from D to A converter 40 and servo amplifier 14 are able to indicate directional changes in movement of the object so that the motor can be driven in one of two directions in order to provide for directional control over movement of object 12.

Although the invention has been described with reference to a specific embodiment thereof, numerous modifications are possible without departing from the invention, and it is desirable to cover all modifications falling within the spirit and scope of this invention.

What I claim as new and desire to secure by Letters Patent of the United States is:

1. A numerical control system comprising:
    a. a motor for moving an object being controlled;
    b. a servo amplifier for driving said motor;
    c. a clock oscillator;
    d. feedback means coupled to said motor for generating a first signal indicative of the actual position of the object and having cyclical transitions;
    e. means for converting the first signal to a digital signal indicative of a change in the actual position of the object comprising:
        1. a counter driven by said clock oscillator;
        2. a first storage means for consecutively receiving a plurality of signals from said counter in response to the respective consecutive transitions of the first signal, each of the received signals having a count indicative of the actual position of the object;
        3. a second storage means for consecutively receiving a plurality of signals from said first storage means in response to the respective consecutive cyclical transitions of the first signal, whereby the signal received in said first storage means in response to one cyclical transition of the first signal is then received in said second storage means in response to a next succeeding cyclical transition of the first signal; and
        4. means for consecutively subtracting the signal stored in said first storage means from the signal stored in said second storage means in response to the respective consecutive cyclical transitions of the first signal to generate the digital signal indicative of the change in the actual position of the object within a time period determined by two successive cyclical transitions of the first signal; and
    f. means for comparing a command digital signal indicative of the desired change in position of the object with the digital signal indicative of the change in the actual position of the object to generate an error digital signal and for converting the error digital signal to an analog signal for driving said servo amplifier.

2. A numerical control system according to claim 1, wherein said feedback means is comprised of:
    a. a resolver responsive to movement of the object;
    b. means for exciting said resolver to generate an output waveform from said resolver indicative of the actual position of the object; and
    c. waveshaping means for changing the output waveform from said resolver to the first signal indicative of the actual position of the object.

* * * * *